United States Patent
Ahn (10) Patent No.: US 9,939,968 B2
(45) Date of Patent: Apr. 10, 2018

(54) TOUCH PANEL AND DISPLAY APPARATUS INCLUDING THE SAME

(71) Applicant: Samsung Display Co., Ltd., Yongin (KR)

(72) Inventor: Soon-Sung Ahn, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 205 days.

(21) Appl. No.: 14/592,603

(22) Filed: Jan. 8, 2015

(65) Prior Publication Data

US 2015/0248179 A1    Sep. 3, 2015

(30) Foreign Application Priority Data

Mar. 3, 2014 (KR) ........................ 10-2014-0024950

(51) Int. Cl.
*G06F 3/044* (2006.01)

(52) U.S. Cl.
CPC .... *G06F 3/044* (2013.01); *G06F 2203/04111* (2013.01)

(58) Field of Classification Search
USPC ....................................................... 345/174
See application file for complete search history.

(56) References Cited

U.S. PATENT DOCUMENTS

| 6,826,968 | B2 | 12/2004 | Manaresi et al. |
| 2010/0045615 | A1 | 2/2010 | Gray et al. |
| 2010/0309167 | A1 | 12/2010 | Nam |
| 2011/0175834 | A1 | 7/2011 | Han et al. |
| 2012/0154323 | A1 | 6/2012 | Nambu |
| 2012/0256877 | A1 | 10/2012 | Lin et al. |
| 2013/0207923 | A1 | 8/2013 | Mohindra et al. |

FOREIGN PATENT DOCUMENTS

| EP | 1211633 | 6/2002 |
| KR | 10-2009-0012514 | 2/2009 |
| KR | 10-2010-0008857 | 1/2010 |
| KR | 10-2011-0040338 | 4/2011 |
| KR | 10-2011-0083957 | 7/2011 |
| KR | 10-2012-0067270 | 6/2012 |

OTHER PUBLICATIONS

Extended European Search Report dated Jul. 14, 2015, in European Patent Application No. 15156275.8.
M. Sergio, et al. "5.4: A Textile Based Capacitive Pressure Sensor," Sensors Conference—Proceedings of the IEEE, Jun. 2002, pp. 1625-1630, vol. 2, Institute of Electrical and Electronics Engineers.

*Primary Examiner* — Gustavo Polo
(74) *Attorney, Agent, or Firm* — H.C. Park & Associates, PLC (57) ABSTRACT

A touch panel including a base portion having a thickness that varies according to applied pressure; a first conductive pattern unit disposed on a first surface of the base portion and including first conductive patterns; and a second conductive pattern unit disposed on a second surface of the base portion opposing the first conductive pattern and including second conductive patterns that overlap with the first conductive patterns. Each of the first conductive patterns includes regions overlapping with the second conductive patterns, and in one of the overlapping regions, an amount of overlapping area between the first conductive pattern and the second conductive pattern decreases the farther away radially the overlapping area is from a center point of the overlapping region.

3 Claims, 7 Drawing Sheets

TOUCH PANEL AND DISPLAY APPARATUS INCLUDING THE SAME

CROSS-REFERENCE TO RELATED APPLICATION

This application claims priority from and the benefit of Korean Patent Application No. 10-2014-0024950, filed on Mar. 3, 2014, which is hereby incorporated by reference for all purposes as if fully set forth herein.

BACKGROUND

1. Field

Exemplary embodiments relate to a touch panel and a display apparatus including the touch panel.

2. Discussion of the Background

Touch panels have recently been used in various fields because they may function as an input device when touched by a user's finger or a pen without using other input units, such as a keyboard.

In particular, display apparatuses have recently been replaced with portable, thin, flat-panel type display apparatuses, in which the technology of applying a touch panel function to the flat-panel type display apparatuses is used. Such a touch panel may include conductive patterns.

Position control in a touch panel requires higher precision according to demand by users. Consequently, when a user touches the touch panel, it is necessary to sense a fine variation of the touch location on the touch panel.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch panel and a display apparatus capable of improving precision in touch recognition and user convenience.

Additional aspects will be set forth in the detailed description which follows, and, in part, will be apparent from the disclosure, or may be learned by practice of the inventive concept.

According to exemplary embodiments, a touch panel includes: a base portion having a thickness that varies according to applied pressure; a first conductive pattern unit disposed on a first surface of the base portion and including first conductive patterns; and a second conductive pattern unit disposed on a second surface of the base portion opposing the first conductive pattern unit and including second conductive patterns that overlap with the first conductive patterns. Each of the first conductive patterns may include regions overlapping with the second conductive patterns, and in one of the overlapping regions, an amount of overlapping area between the first conductive pattern and the second conductive pattern decreases the farther away radially the overlapping area is from a center point of the overlapping region.

According to exemplary embodiments, a display apparatus includes a touch panel and a display panel, the touch panel including: a base portion having a thickness that varies according to pressure; a first conductive pattern unit disposed on a first surface of the base portion and including first conductive patterns; and a second conductive pattern unit disposed on a second surface of the base portion opposing the first conductive pattern unit and including second conductive patterns that overlap with the first conductive patterns. Each of the first conductive patterns may include regions overlapping with the second conductive patterns, and in one of the overlapping regions, an amount of overlapping area between the first conductive pattern and the second conductive pattern may decrease the farther away radially the overlapping area is from a center point of the overlapping region.

The touch panel may be disposed to face a surface of the display panel, which displays images, or an opposite surface.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and together with the description, serve to explain the principles of the invention.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain exemplary embodiment may be implemented differently, a specific process order may be performed differently from the described order. For example, two consecutively described processes may be performed substantially at the same time or performed in an order opposite to the described order. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Exemplary embodiments of the present invention will be described below with reference to accompanying drawings.

Figure 1:
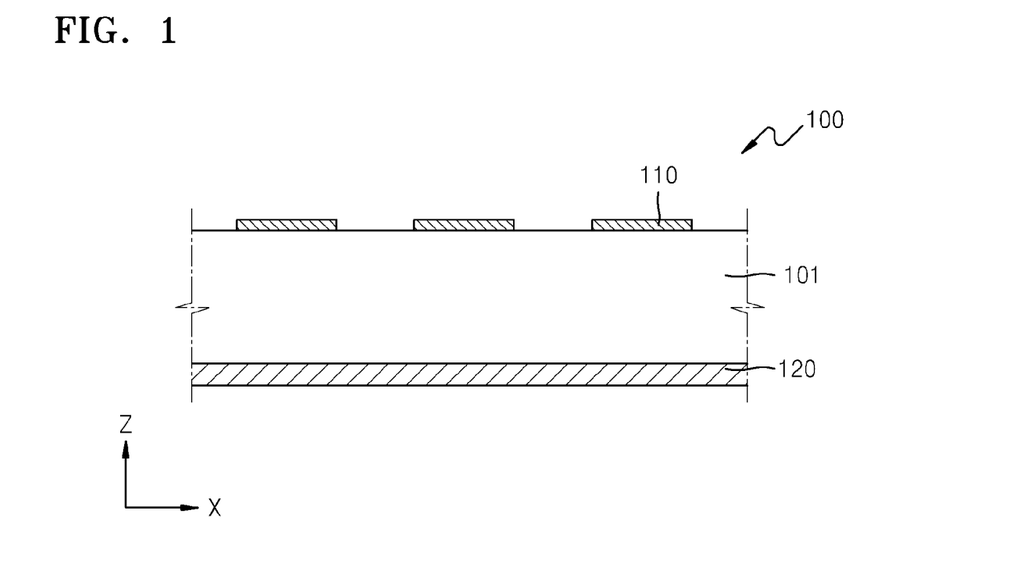
FIG. 1 is a cross-sectional view of a touch panel according to an exemplary embodiment of the present invention.

A touch panel 100 includes a base portion 101, the first conductive pattern unit 110, and the second conductive pattern unit 120.

The thickness of the base portion 101, between an upper surface and a lower surface thereof, may be reduced by the application of pressure. The base portion 101 may be formed of various materials, for example, silicon or a plastic material. Here, the plastic material forming the base portion 101 may include one or more of various organic materials.

The first conductive pattern unit 110 and the second conductive pattern unit 120 are disposed on different surfaces of the base portion 101, that is, surfaces of the base portion 101 that face away from each other.

For example, the first conductive pattern unit 110 may be disposed on an upper surface of the base portion 101, and the second conductive pattern unit 120 may be disposed on a lower surface of the base portion 101.

Figure 2:
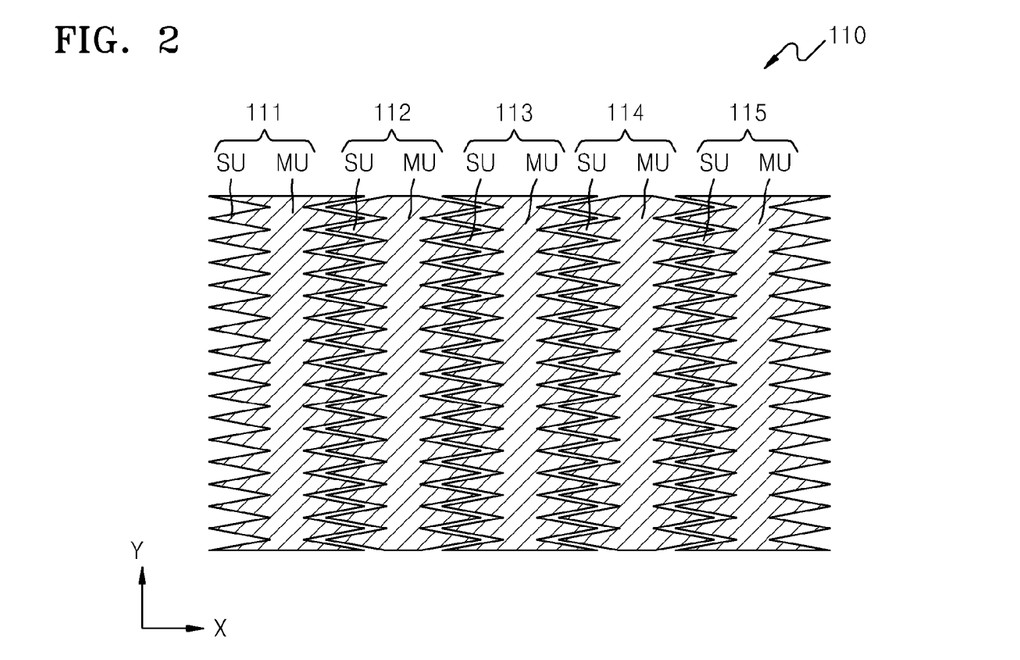
FIG. 2 is a schematic plan view of a first conductive pattern unit in the touch panel of FIG. 1.

The first conductive pattern unit 110 includes first conductive patterns 111 through 115. In FIG. 2, for example, five conductive patterns 111 through 115 are shown, but there is no limitation in the number of the first conductive patterns in the first conductive pattern unit 110.

The first conductive patterns 111 through 115 are sequentially arranged in a first direction (X-axis direction of FIG. 2) and are spaced apart from each other.

The first conductive pattern 111 includes a main member MU and peripheral members SU.

The main member MU of the first conductive pattern 111 is arranged at the center of the first conductive pattern 111, and extends lengthwise in a second direction (Y-axis direction in FIG. 2) that crosses the first direction (X-axis direction of FIG. 2) in which the first conductive patterns 111 and 115 are sequentially arranged and are spaced apart from each other. The main member MU may cross so as to be perpendicular to the first direction (X-axis direction of FIG. 2).

The peripheral members SU of the first conductive pattern 111 are disposed on a periphery of the main member MU to protrude from the main member MU. That is, the peripheral members SU of the first conductive pattern 111 are formed between the main member MU of the first conductive pattern 111 and the main member MU of the first conductive pattern 112 adjacent to the first conductive pattern 111. For example, the peripheral members SU of the first conductive pattern 111 may protrude toward the first conductive pattern 112.

Each of the peripheral members SU of the first conductive pattern 111 extends from a side surface of the main member MU, and has a width that decreases gradually in a direction toward the first conductive pattern 112 adjacent to the first conductive pattern 111. For example, the first conductive pattern 111 may include triangularly-shaped peripheral members SU.

As such, triangularly-shaped spaces are formed between the peripheral members SU. In addition, the peripheral members SU of the first conductive pattern 112 adjacent to the first conductive pattern 111 are disposed in the triangularly-shaped spaces.

For example, the peripheral members SU of the first conductive pattern 111 may be formed in a saw-tooth pattern, and the peripheral members SU of the first conductive pattern 112 adjacent to the first conductive pattern 111 may be formed in a similar saw-tooth pattern. In addition, the peripheral members SU of the first conductive pattern 111 and the peripheral members SU of the first conductive pattern 112 may be alternately disposed.

Figure 12A:
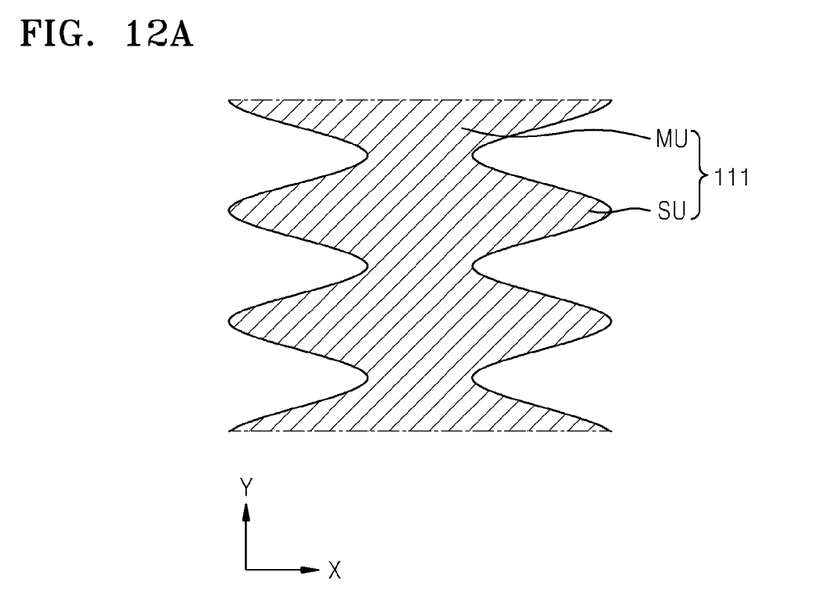
FIG. 12A is a schematic plan view of a first conductive pattern according to another exemplary embodiment of the first conductive pattern of FIG. 2.

In another exemplary embodiment, the peripheral members SU of the first conductive pattern 111 may have curved shapes. That is, the peripheral members SU of the first conductive pattern 111 may extend from the side surface of the main member MU, and may have curved shapes having widths that are gradually reduced toward the first conductive pattern 112 adjacent to the first conductive pattern 111 as shown in FIG. 12A.

The first conductive pattern 112 is disposed adjacent to the first conductive pattern 111. The peripheral members SU of the first conductive pattern 112 are disposed between the peripheral members SU of the first conductive pattern 111 and the first conductive pattern 113 adjacent to the first conductive pattern 112.

The first conductive patterns 112 through 115 are the same as the first conductive pattern 111, and thus, detailed descriptions thereof are not provided here.

Figure 3:
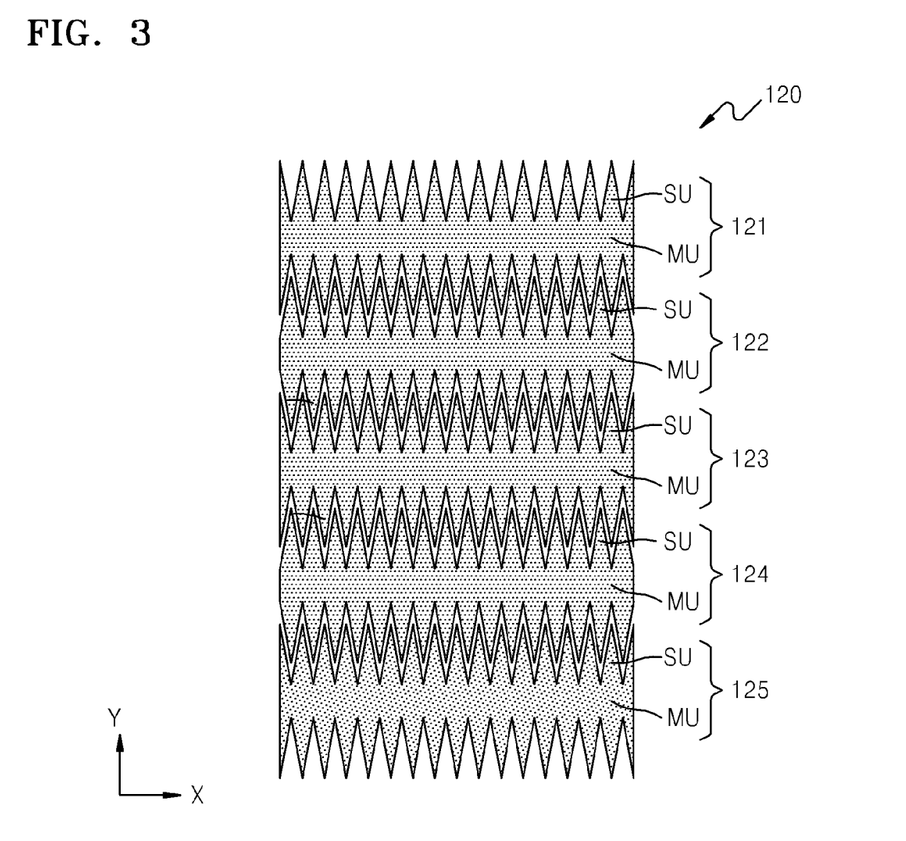
FIG. 3 is a schematic plan view of a second conductive pattern unit in the touch panel of FIG. 1.

The second conductive pattern unit 120 includes second conductive patterns 121 through 125. In FIG. 3, for example, five conductive patterns 121 through 125 are shown, but there is no limitation in the number of second conductive patterns in the second conductive pattern unit 120.

The second conductive patterns 121 through 125 are sequentially arranged in the second direction (Y-axis direction of FIG. 3) and are spaced apart from each other. Also, the second conductive patterns 121 through 125 cross the first conductive patterns 111 through 115 to overlap with the first conductive patterns 111 through 115.

The second conductive pattern 121 includes a main member MU and peripheral members SU.

The main member MU of the second conductive pattern 121 is arranged at the center of the second conductive pattern 121 and extends lengthwise in the first direction (X-axis direction in FIG. 3) that crosses the second direction (Y-axis direction of FIG. 3) in which the second conductive patterns 121 and 125 are sequentially arranged and are spaced apart from each other. The main member MU may cross so as to be perpendicular to the second direction (Y-axis direction of FIG. 3).

The peripheral members SU of the second conductive pattern 121 are disposed on a periphery of the main member MU to protrude from the main member MU. That is, the peripheral members SU of the second conductive pattern 121 are formed between the main member MU of the second conductive pattern 121 and the main member MU of the second conductive pattern 122 adjacent to the second conductive pattern 121. For example, the peripheral members SU of the second conductive pattern 121 may protrude toward the second conductive pattern 122.

The second conductive pattern 121 includes peripheral members SU. Each of the peripheral members SU of the second conductive pattern 121 extends from a side surface of the main member MU, and has a width that is reduced gradually in a direction toward the second conductive pattern 122 adjacent to the second conductive pattern 121. For example, the second conductive pattern 121 may include triangularly-shaped peripheral members SU.

As such, triangularly-shaped spaces are formed between the peripheral members SU. In addition, the peripheral members SU of the second conductive pattern 122 adjacent to the second conductive pattern 121 are disposed in the triangularly-shaped spaces.

For example, the peripheral members SU of the second conductive pattern 121 may be formed in a saw-tooth pattern, and the peripheral members SU of the second conductive pattern 122 adjacent to the second conductive pattern 121 may also be formed in a similar saw-tooth pattern. In addition, the peripheral members SU of the second conductive pattern 121 and the peripheral members SU of the second conductive pattern 122 may be alternately disposed.

Figure 12B:
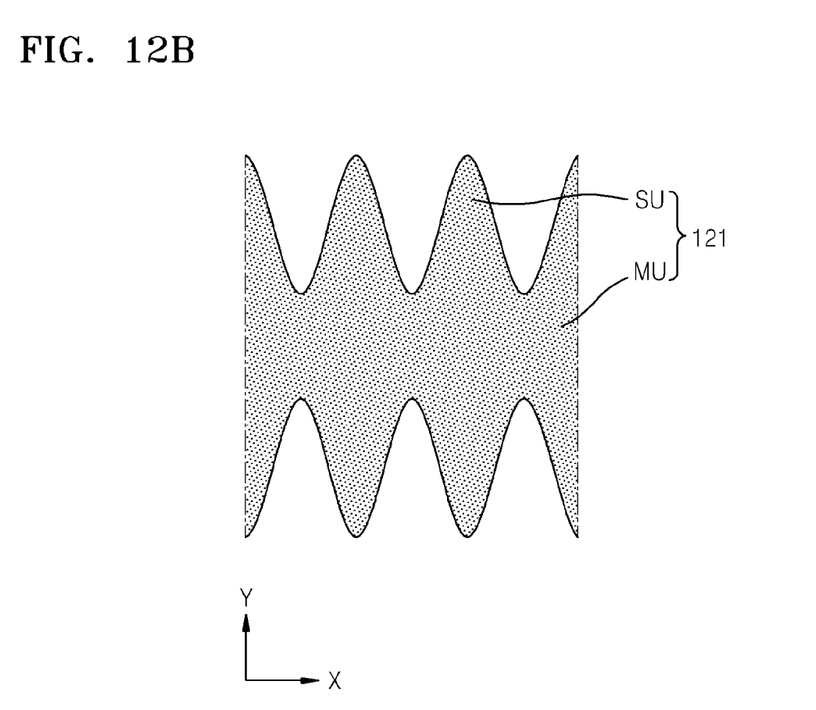
FIG. 12B is a schematic plan view of a second conductive pattern according to another exemplary embodiment of the second conductive pattern of FIG. 3.

In other exemplary embodiments, the peripheral members SU of the second conductive pattern 121 may have curved shapes. That is, the peripheral members SU of the second conductive pattern 121 may extend from the side surface of the main member MU, and may have curved shapes having widths that are gradually reduced toward the second conductive pattern 122 adjacent to the second conductive pattern 121 as shown in FIG. 12B.

The second conductive pattern 122 is disposed adjacent to the second conductive pattern 121. The peripheral members SU of the second conductive pattern 122 are disposed between the peripheral members SU of the second conductive pattern 121 and the second conductive pattern 123 adjacent to the second conductive pattern 122.

The second conductive patterns 122 through 125 are the same as the second conductive pattern 121, and thus, detailed descriptions thereof are not provided here.

Figure 4:
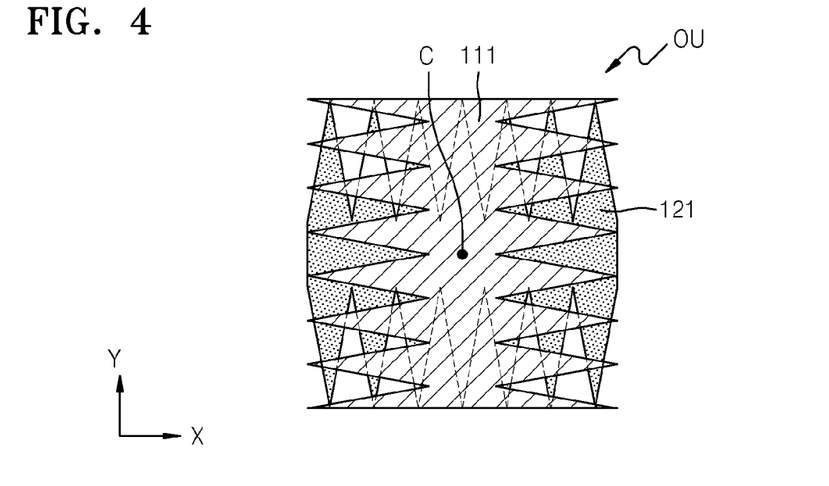
FIG. 4 is a plan view of a part of an overlapping portion between the first conductive pattern unit and the second conductive pattern unit in the touch panel of FIG. 1.

FIG. 4 is a plan view of an overlapping portion between the first conductive pattern unit 110 and the second conductive pattern unit 120 in the touch panel 100 of FIG. 1.

In the touch panel 100 of the present exemplary embodiment, the first conductive pattern unit 110 is disposed on the upper surface of the base portion 101, and the second conductive pattern unit 120 is disposed on the lower surface of the base portion 101. Thus, the first conductive pattern unit 110 and the second conductive pattern unit 120 may partially overlap with each other.

For example, the first conductive pattern 111 of the first conductive pattern unit 110 overlaps with each of the second conductive patterns 121 through 125 in the second conductive pattern unit 120.

In FIG. 4, an overlapping unit OU between the first conductive pattern 111 and the second conductive pattern 121 is shown in order to describe a region in which the first conductive pattern 111 of the first conductive pattern unit 110 and the second conductive pattern 121 of the second conductive pattern unit 120 overlap with each other.

The area of the overlapping region between the first conductive pattern 111 and the second conductive pattern 121 decreases the farther away it is from a center point C of the overlapping unit OU in the X-axis direction. Also, the area of the overlapping region between the first conductive pattern 111 and the second conductive pattern 121 decreases the farther away it is from the center point C of the overlapping unit OU in the Y-axis direction. Consequently, the area of the overlapping region between the first conductive pattern 111 and the second conductive pattern 121 decreases the farther away it is radially from the center point C of the overlapping unit OU.

Figure 5:
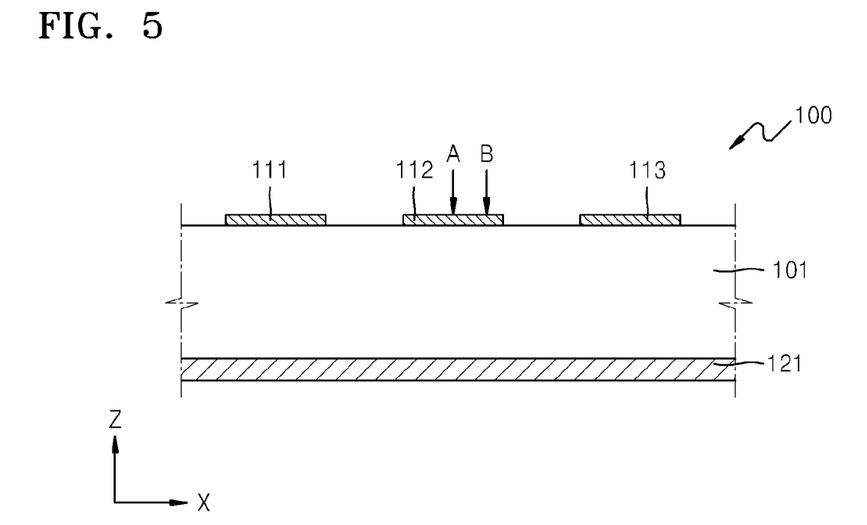
FIG. 5 and FIG. 6 are diagrams illustrating examples of operating the touch panel of FIG. 1.
Figure 6:
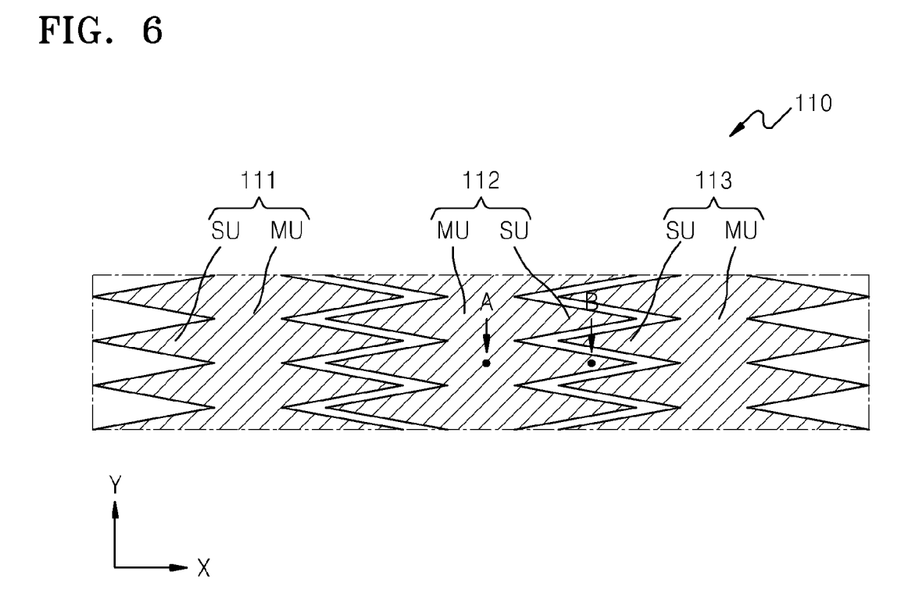
Figure 7A:
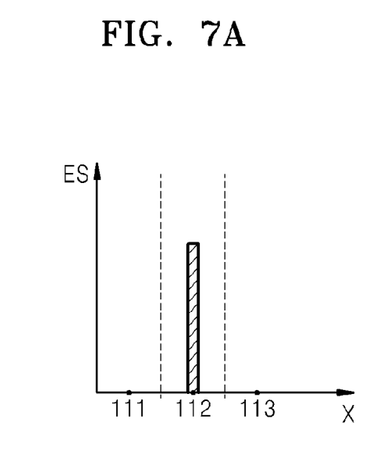
FIGS. 7A and 7B are graphs showing results of the examples of operating the touch panel of FIGS. 5 and 6.

FIGS. 5 and 6 are diagrams illustrating examples of operating the touch panel 100 of FIG. 1. FIG. 7A are graphs showing results of operating the touch panel in FIGS. 5 and 6.

Referring to FIG. 5, a user touches two points A and B from above the base portion 101. In particular, the touches are on an upper surface of the first conductive pattern 112 of the first conductive pattern unit 110.

FIG. 6 is a plan view of the touch panel of FIG. 5.

If the user touches the touch panel 100, a pressure generated by the touch is transferred to the first conductive pattern unit 110 and the base portion 101. In addition, the base portion 101 is contracted by the pressure, and thus, a thickness of the portion in the base portion 101, on which the user's touch occurs, is reduced. In this case, a distance between locations, which correspond to the touched point, of the first conductive pattern unit 110 and the second conductive pattern unit 120 is reduced, while the base portion 101 is interposed between the first conductive pattern unit 110 and the second conductive pattern unit 120. In other words, the elasticity of the base portion 101 is set, such that when pressure corresponding to a touch (touch pressure) is applied thereto, the thickness of the base portion 101 is reduced in a portion where the touch pressure is applied. Thus, the distance between conductive patterns is reduced where the touch pressure is applied. The "touch pressure" refers to an amount of pressure that is generally applied to a touch screen by contact with an external object, such as a finger or stylus.

As such, an electrostatic capacitance between the first conductive pattern unit 110 and the second conductive pattern unit 120 is changed, and the touch panel 100 recognizes the user's touch by sensing a change in the electric signal, such as the variation in the electrostatic capacitance.

As shown in FIGS. 5 and 6, the user may touch two points A and B in one of the first conductive patterns of the first conductive pattern unit 110, for example, in the first conductive pattern 112.

If the user touches the point A that is relatively close to the center in the first conductive pattern 112, that is, the main member, and generates a pressure, there is a little impact on the first conductive patterns 111 and 113 that are adjacent to the first conductive pattern 112. That is, when the user touches the point A in the first conductive pattern 112 to generate the pressure, a portion of the base portion 101, which corresponds to the point A, is reduced, and accordingly, the distance between the first conductive pattern 112 and the second conductive pattern 121 decreases. In addition, an electric signal between the first conductive pattern 112 and the second conductive pattern 121, for example, the electrostatic capacitance, is changed. However, the thickness of the base portion 101 rarely changes in locations corresponding to the first conductive patterns 111 and 113 that are adjacent to the first conductive pattern 112. Therefore, the electric signal between the first conductive pattern 111 and the second conductive pattern 121 and the electric signal between the first conductive pattern 113 and the second conductive pattern 121 are not changed.

A graph of FIG. 7A shows the above result in detail. That is, in the graph of FIG. 7A, an X-axis denotes the first conductive patterns 111, 112, and 113, and a Y-axis denotes a variation amount of electrostatic capacitances (ES) between each of the first conductive patterns 111 through 113 and the second conductive pattern 121.

Referring to the graph of FIG. 7A, when the user touches the point A, a variation in the electrostatic capacitance between only the first conductive pattern 112 and the second conductive pattern 121 is sensed.

However, if the user touches the point B that is relatively far from the center of the first conductive pattern 112, that is, the peripheral member, to generate pressure, the first conductive pattern 113 adjacent to the first conductive pattern 112 is affected, whereas the first conductive pattern 111 is not.

That is, when the user touches the point B in the first conductive pattern 112 and applies pressure, a thickness of the region corresponding to the point B in the base portion 101 is reduced. As such, a distance between the locations of the first conductive pattern 112 and the second conductive pattern 121, which correspond to the point B, decreases. In addition, an electric signal between the first conductive pattern 112 and the second conductive pattern 121, for example, an electrostatic capacitance, is changed.

Here, the point B corresponds to an edge of the first conductive pattern 112, that is, the peripheral member SU, and is adjacent to the peripheral member SU of the first conductive pattern 113. That is, when the thickness of the base portion 101 corresponding to the point B is changed, a thickness of a region in the base portion 101, which corresponds to the peripheral member SU of the first conductive pattern 113 adjacent to the point B is also changed.

Thus, only a small change occurs in an electric signal between the first conductive pattern 113 and the second conductive pattern 121.

Figure 7B:
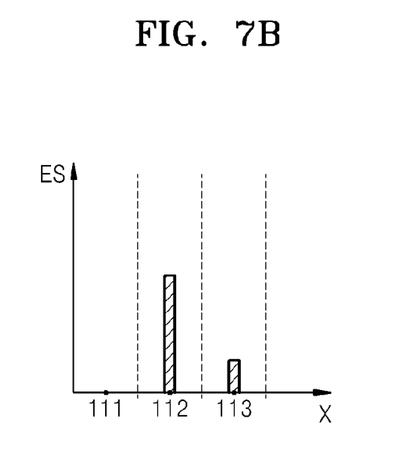

FIG. 7B shows a result of the above operation. That is, in the graph of FIG. 7B, an X-axis denotes the first conductive patterns 111, 112, and 113, and a Y-axis denotes a variation amount in an electrostatic capacitance (ES) between each of the first conductive patterns 111 through 113, and the second conductive pattern 121.

Referring to FIG. 7B, when the user touches the point B, a variation in the electrostatic capacitance is sensed mainly between the first conductive pattern 112 and the second conductive pattern 121, and a variation in the electrostatic capacitance between the first conductive pattern 113 adjacent to the first conductive pattern 112 and the second conductive pattern 121 is sensed less than that between the first conductive pattern 112 and the second conductive pattern 121.

According to the touch panel 100 of the present exemplary embodiment, magnitudes and kinds of the electric signals differ from each other when the point A is touched and the point B is touched in the first conductive pattern unit 110. Thus, the touch panel 100 may recognize the touches on the point A and the point B in the first conductive pattern unit 110 as different kinds of touches, and thus, may recognize the touch input accurately.

That is, when the user touches different points in the first conductive pattern 111 of the first conductive pattern unit 110, effects on the first conductive pattern 112 adjacent to the first conductive pattern 111 may be different in a case where a region corresponding to the main member MU is touched and in a case where a region corresponding to the peripheral member SU is touched.

That is, a difference between the thickness of the base portion 101 caused by the pressure generated when touching the touch screen 100 may cause the distance between the first conductive pattern unit 110 and the second conductive pattern unit 120 to vary. Thus, a difference in the amount of variation of the electrostatic capacitance is generated.

In particular, when two different points in the first conductive pattern 111 are touched by the user, the distances between the first conductive pattern 112 adjacent to the first conductive pattern 111 and the second conductive pattern 121 are changed a small amount, which cause the variation in the electrostatic capacitance. Specifically, the thickness variation of the base portion 101 may be recognized with high sensitivity as a result of the peripheral members SU of the first conductive pattern 112, which are sequentially arranged between the peripheral members SU of the first conductive pattern 111. Accordingly, the amount of variation in the electrostatic capacitance may be sensed accurately, and precision of the touch recognition may be improved.

Figure 8A:
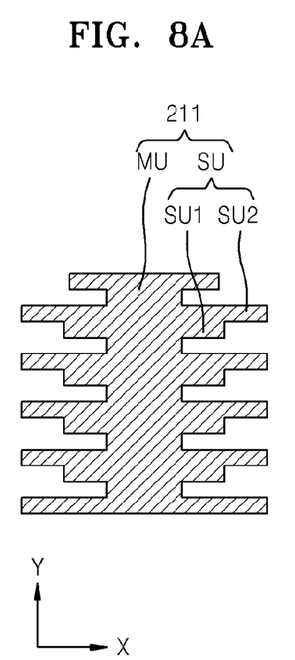
FIGS. 8A, 8B, and 8C are schematic plan views of a first conductive pattern unit; a second conductive pattern unit; and the overlap of both the first and second conductive patterns in each unit, respectively, according to another exemplary embodiment of the present invention.
Figure 8B:
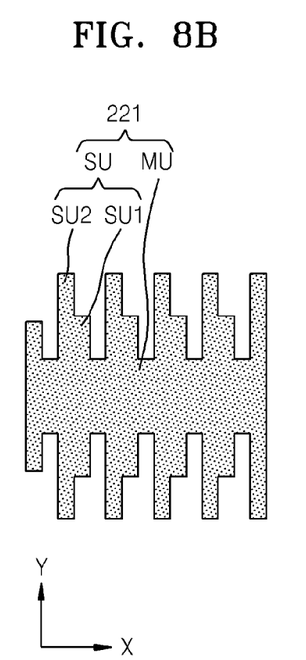
Figure 8C:
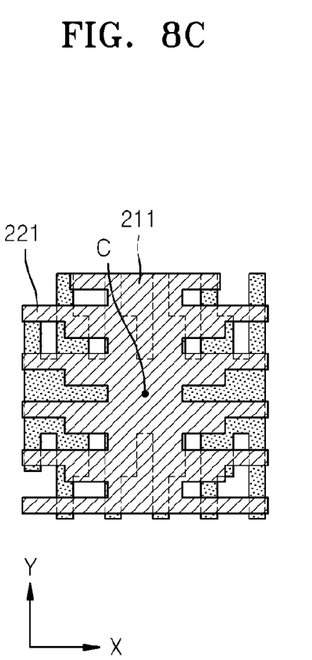

FIG. 8A shows a first conductive pattern 211 included in a first conductive pattern unit, FIG. 8B shows a second conductive pattern 221 included in a second conductive pattern unit, and FIG. 8C shows an overlapping region between the first conductive pattern 211 and the second conductive pattern 221.

Referring to FIG. 8A, only the first conductive pattern 211 is disposed. However, the first conductive pattern unit may include a plurality of first conductive patterns in addition to the first conductive pattern 211. The first conductive pattern 211 includes a main member MU and peripheral members SU. The main member MU of the first conductive pattern 211 is arranged at a center of the first conductive pattern 211, and is elongated.

The peripheral members SU of the first conductive pattern 211 are disposed around the main member MU and protrude from the main member MU. Each of the peripheral members SU includes a first region SU1 and a second region SU2. The first region SU1 is connected to the main member MU, and the second region SU2 is connected to the first region SU1. The second region SU2 is formed to have a width that is less than that of the first region SU1.

That is, the first region SU1 has a rectangular shape, and the second region SU2 has a rectangular shape that is connected to the first region SU1. As such, a side surface of the main member MU has portions that are not connected to the first regions SU1. That is, the side surface of the main member MU includes lateral regions corresponding to spaces between the first regions SU1. Second regions SU2 of the peripheral members SU of another first conductive pattern may be arranged to be close to the lateral regions of the main member MU. Accordingly, precision of the touch recognition with respect to the touches on the different locations corresponding to the main member may be improved.

The first conductive pattern 211 includes the peripheral members SU. Empty spaces are formed between the peripheral members SU. In addition, the peripheral members of another first conductive pattern (not shown) adjacent to the first conductive pattern 211 are disposed in the empty spaces.

Also, each of the peripheral members SU extends from the side surface of the main member MU, and as described above, the peripheral members SU are arranged to have preset intervals therebetween so as not to cover the entire side surface of the main member MU.

FIG. 8B shows only a second conductive pattern 221. However, the second conductive pattern unit may include a plurality of second conductive patterns in addition to the second conductive pattern 221, as described above. The second conductive pattern 221 includes a main member MU and peripheral members SU.

The main member MU of the second conductive pattern 221 is arranged at a center of the second conductive pattern 221, and is elongated. For example, the main member MU of the second conductive pattern 221 may be elongated in a direction that crosses the main member MU of the first conductive pattern 211 or that is perpendicular to the main member MU of the first conductive pattern 211.

The peripheral members SU of the second conductive pattern 221 are arranged around the main member MU, and protrude from the main member MU. Each of the peripheral members SU includes a first region SU1 and a second region SU2. The first region SU1 is connected to the main member MU, and the second region SU2 is connected to the first region SU1. The second region SU2 is formed to have a width that is less than that of the first region SU1.

That is, the first region SU1 has a rectangular shape, and the second region SU2 has a rectangular shape that is connected to the first region SU1. As such, a side surface of the main member MU has portions that are not connected to the first regions SU1. That is, the side surface of the main member MU includes lateral regions corresponding to empty spaces between the first regions SU1. Second regions SU2 of the peripheral members SU of another first conductive pattern may be arranged to be close to the lateral regions of the main member MU. Accordingly, precision of the touch recognition with respect to the touches on the different locations corresponding to the main member may be improved.

The second conductive pattern 221 includes the peripheral members SU extending from the side surface of the main member MU. Empty spaces are formed between the peripheral members SU. In addition, the peripheral members of another second conductive pattern (not shown) adjacent to the second conductive pattern 221 are disposed in the empty spaces.

Each of the peripheral members SU extends from the side surface of the main member MU, and as described above, the peripheral members SU are arranged to have intervals therebetween so as not to cover the entire side surface of the main member MU.

FIG. 8C shows an overlapping region between the first conductive pattern 211 and the second conductive pattern 221. That is, as described in the previous exemplary embodiment, the first conductive pattern 211 and the second conductive pattern 221 are arranged while interposing a base portion (not shown) therebetween, and have an overlapping region.

An area of the overlapping region between the first conductive pattern 211 and the second conductive pattern 221 decreases the farther away it is from a center point C of the overlapping region between the first conductive pattern 211 and the second conductive pattern 221 in the X-axis direction. Also, the area of the overlapping region decreases the farther it is from the center point C of the overlapping region in the Y-axis direction. Consequently, the area of the overlapping region between the first conductive pattern 211 and the second conductive pattern 221 decreases the farther away it is radially from the center point C.

In a case of the touch panel including the first conductive pattern 211 and the second conductive pattern 221, as described in the previous exemplary embodiment, when a user touches two different points in one first conductive pattern 211, distances between another first conductive pattern (not shown) adjacent to the first conductive pattern 211 and the second conductive pattern 221 are changed a fine amount and cause variations in electrostatic capacitances. In particular, as a result of peripheral members (not shown) of another first conductive pattern (not shown), which are sequentially arranged in spaces between the peripheral members SU of the first conductive pattern 211, the thickness variation of a base portion (not shown) when the user touches the touch panel is recognized with high sensitivity. Thus, the variation amount of the electrostatic capacitance caused by the thickness variation of the base portion may be precisely sensed, resulting in greater precision in the touch recognition may.

Figure 9A:
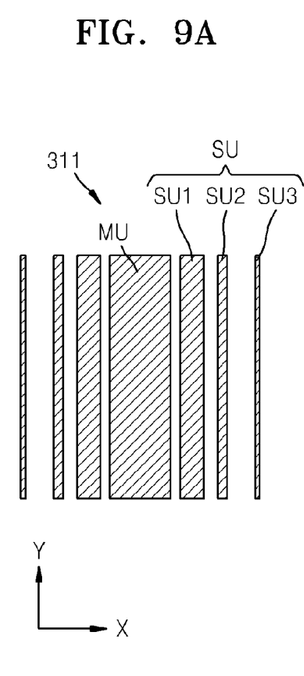
FIGS. 9A, 9B, and 9C are schematic plan views of a first conductive pattern unit; a second conductive pattern unit; and the overlap of both the first and second conductive patterns in each unit, respectively, according to another exemplary embodiment of the present invention.
Figure 9B:
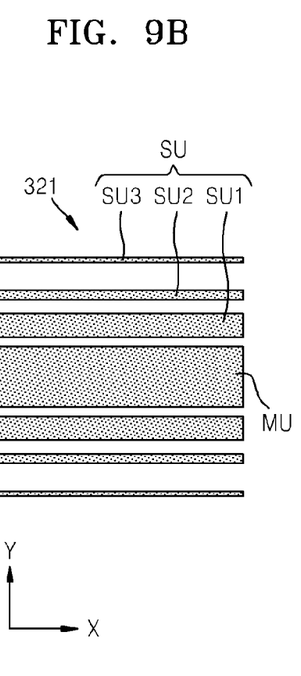
Figure 9C:
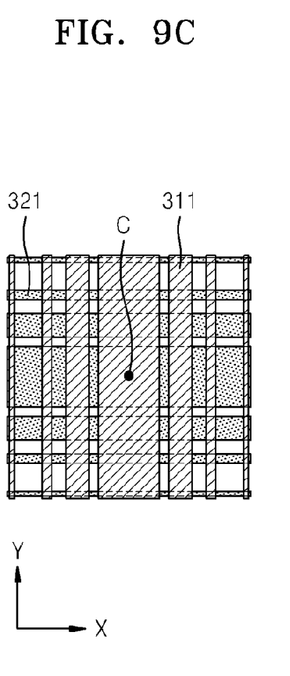

FIG. 9A shows a first conductive pattern 311 included in the first conductive pattern unit; FIG. 9B shows a second conductive pattern 321 included in the second conductive pattern unit, and FIG. 9C shows an overlapping region between the first conductive pattern 311 and the second conductive pattern 321.

FIG. 9A shows only the first conductive pattern 311. However, the first conductive pattern unit may include a plurality of first conductive patterns in addition to the first conductive pattern 311. The first conductive pattern 311 includes a main member MU and a plurality of peripheral members SU. The main member MU of the first conductive pattern 311 is arranged at a center of the first conductive pattern 311, and is elongated.

The peripheral members SU of the first conductive pattern 311 are arranged around the main member MU, and are elongated in parallel with the main member MU. The peripheral members SU include a first region SU1, a second region SU2, and a third region SU3.

The first, second, and third regions SU1, SU2, and SU3 are sequentially arranged based on the main member MU in a direction away from the main member MU.

Widths of the first region SU1, the second region SU2, and the third region SU3 are formed in such a manner that they decrease gradually, in that order. In addition, a distance between the main member MU and the first region SU1, a distance between the first region SU1 and the second region SU2, and a distance between the second region SU2 and the third region SU3 gradually increase, in that order.

FIG. 9B shows only the second conductive pattern 321. However, as described in the previous exemplary embodiment, the second conductive pattern unit may include a plurality of second conductive patterns in addition to the second conductive pattern 321.

The second conductive pattern 321 includes a main member MU and peripheral members SU. The main member MU of the second conductive pattern 321 is arranged at a center of the second conductive pattern 321, and is elongated. For example, the main member MU of the second conductive pattern 321 may be extended in a direction that crosses the main member MU of the first conductive pattern 311, or perpendicular to the main member MU of the first conductive pattern 311.

The peripheral members SU of the second conductive pattern 321 are arranged around the main member MU, and are elongated in parallel with the main member MU. The peripheral members SU include a first region SU1, a second region SU2, and a third region SU3.

The first, second, and third regions SU1, SU2, and SU3 are sequentially arranged based on the main member MU in a direction away from the main member MU.

Widths of the first region SU1, the second region SU2, and the third region SU3 are formed in such a manner that they decrease gradually, in that order. In addition, a distance between the main member MU and the first region SU1, a distance between the first region SU1 and the second region SU2, and a distance between the second region SU2 and the third region SU3 gradually increase, in that order.

FIG. 9C shows an overlapping region between the first conductive pattern 311 and the second conductive pattern 321. That is, as described above, the first conductive pattern 311 and the second conductive pattern 321 are disposed such that a base portion (not shown) is interposed between the first and second conductive patterns 311 and 321, to form an overlapping region.

An area of the overlapping region between the first conductive pattern 311 and the second conductive pattern 321 decreases the farther away it is from a center point C of the overlapping region between the first conductive pattern 311 and the second conductive pattern 321 in the X-axis direction. Also, an area of the overlapping region decreases the farther away it is from the center point C of the overlapping region in the Y-axis direction. Consequently, the area of the overlapping region between the first conductive pattern 311 and the second conductive pattern 321 decreases the farther away it is radially from the center point C.

In the touch panel including the first conductive pattern 311 and the second conductive pattern 321 of the present exemplary embodiment, if a user touches two different points in the first conductive pattern 311, that is, a point corresponding to the main member MU and a point corresponding to the peripheral member SU, distances from the touched points to the base portion (not shown) are changed differently from each other.

In addition, the variation in the distances to the base portion (not shown) causes a difference between the variation amounts of the electrostatic capacitances between the first conductive pattern 311 and the second conductive pattern 321. That is, when the user touches a point corresponding to the main member MU, the thickness of the base portion (not shown) is reduced, and the electrostatic capacitance between the first conductive pattern 311 and the second conductive pattern 321 varies. The amount of variation of the electrostatic capacitance when the main member MU is touched is different from the amount of variation of the electrostatic capacitance between the first conductive pattern 311 and the second conductive pattern 312 when the point corresponding to the peripheral unit SU is touched. Thus, precision of the touch recognition may be improved. Here, because the peripheral members SU include the regions SU1, SU2, and SU3, the precision may be further improved.

Although not shown in the drawings, the number of regions included in the peripheral members SU may vary.

Figure 10:
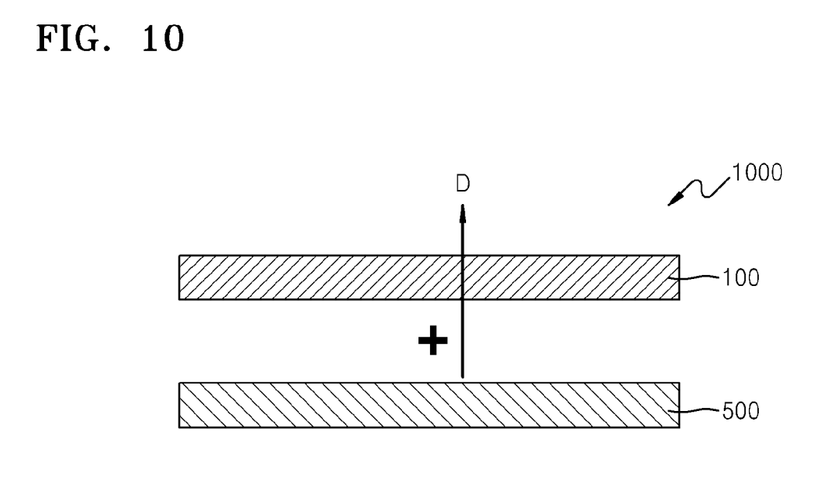
FIG. 10 is a schematic diagram of a display apparatus according to an exemplary embodiment of the present invention.

FIG. 10 is a schematic diagram of a display apparatus 1000 according to an exemplary embodiment of the present invention.

Referring to FIG. 10, the display apparatus 1000 includes a touch panel 100 and a display panel 500. Because the touch panel 100 is the same as the touch panel 100 shown in FIG. 1, detailed descriptions thereof are omitted here.

Although not shown in FIG. 10, the display apparatus 1000 according to the present exemplary embodiment may include the touch panel including the first conductive pattern 211 and the second conductive pattern 221 shown in FIGS. 8(A)-8(C). Otherwise, according to another exemplary embodiment of the present invention, the display apparatus 1000 may include the touch panel including the first conductive pattern 311 and the second conductive pattern 321 shown in FIG. 9(A)-9(C).

The touch panel 100 and the display panel 500 may be coupled to each other without interposing an additional member. However, various members having various functions may be interposed between the touch panel 100 and the display panel 500.

In FIG. 10, the touch panel 100 is disposed on the display panel 500. In this case, since images are displayed from the display panel 500 in an arrow D direction, the touch panel 100 may be formed of a light transmitting material. For example, the first conductive pattern unit 110 and the second conductive pattern unit 120 of the touch panel 100 may be formed of a conductive material that may transmit light. For example, a conductive material may be used, such as indium tin oxide (ITO), carbon nanotubes, or a graphene material.

Various types of the display panel 500 may be formed. For example, the display panel 500 may include an organic light emitting display (OLED) device or a liquid crystal display (LCD) device.

Figure 11:
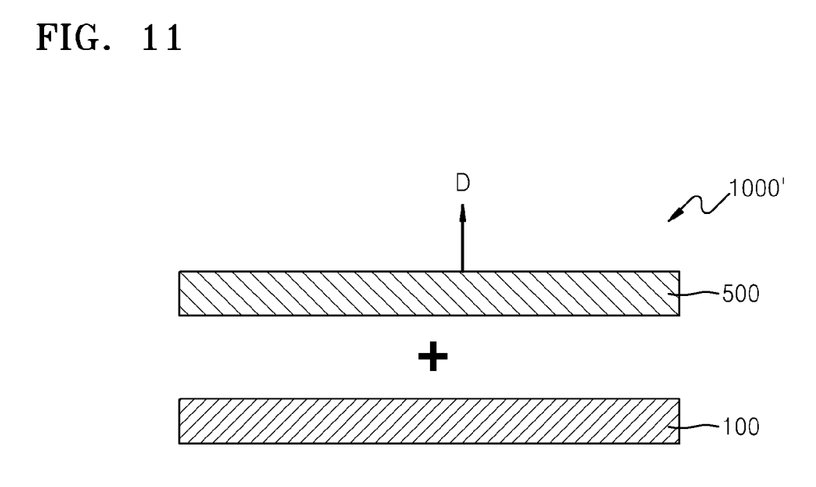
FIG. 11 is a schematic diagram of a display apparatus according to another exemplary embodiment of the present invention.

FIG. 11 is a schematic diagram of a display apparatus 1000' according to another exemplary embodiment of the present invention.

Referring to FIG. 11, the display apparatus 1000' includes the touch panel 100 and the display panel 500. Since the touch panel 100 is the same as the touch panel shown in FIG. 1, detailed descriptions thereof are omitted here.

Although not shown in FIG. 11, the display apparatus 1000' of the present exemplary embodiment may include the touch panel including the first conductive pattern 211 and the second conductive pattern 221 shown in FIGS. 8A-8C. Otherwise, according to another exemplary embodiment of the present invention, the display apparatus 1000' may include the touch panel including the first conductive pattern 311 and the second conductive pattern 321 shown in FIGS. 9A-9C.

The touch panel 100 and the display panel 500 may be coupled to each other without interposing an additional member. However, various members having various functions may be interposed between the touch panel 100 and the display panel 500.

In FIG. 11, the display panel 500 is disposed on the touch panel 100. In this case, when images are displayed from the display panel 500 in an arrow D direction, the touch panel 100 does not interfere with emission of the images. Thus, the touch panel 100 may be formed of an opaque material. For example, the first conductive pattern unit 110 and the second conductive pattern unit 120 of the touch panel 100 may be formed of an opaque metal material having high conductivity. However, the present invention is not limited thereto, that is, the first conductive pattern unit 110 and the second conductive pattern unit 120 of the touch panel 100 may be formed of a conductive material transmitting light. The display panel 500 may be configured as various types. For example, the display panel 500 may include an OLED or an LCD device.

The display apparatus 1000 or 1000' according to the exemplary embodiments of the present invention may have an improved precise touch recognition function by including the touch panel 100 described above, thereby resulting in increased user convenience with respect to the display apparatus 1000 or 1000'.

Although exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch panel comprising:
   a base portion having a thickness that varies according to applied pressure;
   a first conductive pattern unit disposed on a first surface of the base portion, the first conductive pattern unit comprising first conductive patterns; and
   a second conductive pattern unit disposed on a second surface of the base portion opposing the first conductive pattern unit, the second conductive pattern unit comprising second conductive patterns overlapping with the first conductive patterns at overlapping regions,
   wherein:
   in each of the overlapping regions, an amount of overlapping area between the first conductive pattern and the second conductive pattern decreases the farther away radially the overlapping area is from a center point of the overlapping region;
   each of the first conductive patterns comprises a main member and peripheral members;
   the peripheral members are disposed around the main member and protrude from the main member, each of the peripheral members including a first region connected to the main member and a second region connected to the first region;
   the second region is formed to have a width less than that of the first region; and
   the first region and the second region have a stepped shape.

2. The touch panel of claim 1, wherein the first conductive patterns cross the second conductive patterns.

3. The touch panel of claim 1, wherein the first conductive patterns are sequentially arranged in a first direction and are spaced apart from each other, and the second conductive patterns are arranged in a second direction crossing the first direction.

* * * * *